(12) United States Patent
Romo et al.

(10) Patent No.: US 7,114,425 B2
(45) Date of Patent: Oct. 3, 2006

(54) FINE-ADJUSTMENT MECHANISM TO PRESET A MITER SAW FOR PRECISION MITER CUTS

(75) Inventors: Ezequiel Romo, Chicago, IL (US); Kenneth N. Svetlik, Schaumburg, IL (US)

(73) Assignee: Credo Technology Corporation, Broadview, IL (US)

( * ) Notice: Subject to any disclaimer, the term of this patent is extended or adjusted under 35 U.S.C. 154(b) by 0 days.

(21) Appl. No.: 10/702,332

(22) Filed: Nov. 6, 2003

(65) Prior Publication Data

US 2004/0154448 A1    Aug. 12, 2004

Related U.S. Application Data

(63) Continuation-in-part of application No. 10/135,299, filed on Apr. 30, 2002, now abandoned.

(51) Int. Cl.
*B23D 19/00* (2006.01)
*B27B 5/00* (2006.01)

(52) U.S. Cl. ........................... 83/471.3; 83/490
(58) Field of Classification Search ............... 83/471.3, 83/490, 767; 269/63, 57; 74/813 R
See application file for complete search history.

(56) References Cited

U.S. PATENT DOCUMENTS

| | | | |
|---|---|---|---|
| 2,884,965 A | 5/1959 | Stahl | |
| 3,049,193 A * | 8/1962 | Ingersoll | 74/813 R |
| 3,085,452 A * | 4/1963 | Thompson | 74/813 R |
| 4,011,782 A * | 3/1977 | Clark et al. | 83/471.3 |
| 4,152,961 A * | 5/1979 | Batson | 83/471.3 |
| 4,452,117 A | 6/1984 | Brickner et al. | |
| 4,721,017 A * | 1/1988 | Jorgensen et al. | 74/813 R |
| 4,779,354 A | 10/1988 | Hill | |
| 4,934,233 A | 6/1990 | Brundage et al. | |
| 5,038,486 A | 8/1991 | Ducate, Sr. | |
| 5,042,348 A | 8/1991 | Brundage et al. | |
| 5,063,983 A | 11/1991 | Barry | |
| 5,181,448 A | 1/1993 | Terpstra | |
| 5,215,296 A | 6/1993 | Adams et al. | |

(Continued)

OTHER PUBLICATIONS

Craftsman: Power and Hand Tools, Sears Catalog, 2003-2004, p. 145.*

*Primary Examiner*—Timothy V. Eley
*Assistant Examiner*—Jason Prone
(74) *Attorney, Agent, or Firm*—Maginot, Moore & Beck

(57) ABSTRACT

A fine-adjustment mechanism for making small adjustments to a cutting angle on a miter saw. The mechanism is used in conjunction with an apparatus that includes a base having at least one recess, and a turntable that supports a cutting tool is rotatably mounted to the base. An angular-adjustment lever is pivotally mounted to the turntable. The angular-adjustment lever includes a first insert proximal to the turntable. The first insert is capable of engaging at least one recess. The fine-adjustment mechanism is mounted to the turntable and includes a fine-adjustment lever pivotally mounted on the turntable. The fine-adjustment lever may include a plurality of notches. A second insert having an opening therethrough is supported by the fine-adjustment lever and adapted to engage at least one recess of the base. A threaded rod supported by the fine-adjustment lever extends through the opening in the second insert. A latch holder may be attached to the fine-adjustment lever. The latch holder contains a spring secured by a retainer plate and a latch having a plurality of protrusions capable of mating with the plurality of notches in the fine-adjustment lever.

20 Claims, 16 Drawing Sheets

U.S. PATENT DOCUMENTS

| | | | |
|---|---|---|---|
| 5,249,496 A * | 10/1993 | Hirsch et al. ............... 83/471.3 |
| 5,265,511 A * | 11/1993 | Itzov ........................... 83/490 |
| 5,337,641 A | 8/1994 | Duginske |
| 5,402,581 A | 4/1995 | Hurd et al. |
| 5,425,294 A | 6/1995 | Ushiwata et al. |
| 5,533,273 A | 7/1996 | Lawson et al. |
| 5,623,860 A | 4/1997 | Schoene et al. |
| 5,735,054 A | 4/1998 | Cole |
| 5,862,732 A * | 1/1999 | Itzov .......................... 83/471.3 |
| 6,003,571 A * | 12/1999 | Broussard .................... 269/57 |
| 2003/0200852 A1* | 10/2003 | Romo ......................... 83/473 |
| 2004/0074362 A1* | 4/2004 | Svetlik et al. ............. 83/471.3 |
| 2005/0229761 A1* | 10/2005 | Bettacchini .................. 83/490 |

* cited by examiner

FINE-ADJUSTMENT MECHANISM TO PRESET A MITER SAW FOR PRECISION MITER CUTS

CROSS-REFERENCE TO RELATED PATENT APPLICATIONS

This patent application is a continuation-in-part of U.S. patent application Ser. No. 10/135,299 filed Apr. 30, 2002 now abandoned.

FIELD OF THE INVENTION

This invention pertains to power tools and, more particularly, to a miter cut adjustment mechanism for use with a cutting tool that allows for adjustment of a cutting angle to a number of predetermined positions as well as precise adjustment of the angle near the predetermined positions.

BACKGROUND OF THE INVENTION

A miter saw typically has the capacity to crosscut work pieces placed against its horizontal table and vertical fence. This saw can be rotated to make vertical cuts through a work piece at various angles relative to the fence. A vertical cut is known as a "miter cut."

A compound miter saw has the capability to tilt the blade (counterclockwise) to an angle relative to the table, generally from 0° to 45° left of vertical. A cut made with the blade tilted at an angle (and perpendicular to the fence) is known as a "bevel cut." A cut made with the blade set to both an angle relative to the fence (miter angle) and an angle relative to the base (bevel angle) is known as a "compound cut."

A dual bevel compound miter saw has the added capacity to tilt the blade to an angle relative to the table generally from 45° left of vertical to 45° right of vertical. This arrangement allows for more "compound cut" variations.

A slide miter saw has the saw component mounted to a rail system allowing it to slide backward and forward thereby increasing the saw's cutting capacities. The slide mechanisms are typically added to a compound saw.

Miter saws typically include a detent system that allows the table and the attached cutting tool to be preset to specific angles relative to the fixed fence. A detent system provides an accurate means to preset and reset the saw to make the most popular cuts. A miter saw typically provides 10 to 12 preset detent positions or recesses.

The typical miter saw table includes a rotating disc-like work surface that is supported by the tools' base. The table includes a support member for a lock handle in the front and a saw mounting area to the rear, behind the fence. In addition, a spring-loaded retractable detent pin or wedge is mounted in the handle area The base typically has a rounded front shape that is concentric with its table and includes detent holes or slots positioned to accept the above-mentioned pin or wedge. The locking handle moves to create pressure against the rounded front of the base outside of the detent slot or hole locations. The lock handle may be of a rotating screw-type or lever cam-type design. In order to indicate the saw's preset cutting position, the rotating table supports a pointer that relates to an angle scale on the fixed base.

In using a detent system to preset the miter cut angle, the user would first loosen the lock handle, and retract the detent pin or insert. This would be followed by rotating the table, releasing the detent pin or insert into a desired slot or recess, and relocking the handle. Some users rely on the detent system to hold the saws' position for cutting without using the lock handle.

If a user wants to preset the miter saw for an angle cut not provided by the detent system, he would allow the spring-loaded pin or insert to rest against the front surface of the base outside of the detent slots and tighten the locking handle. For these cuts, the user must use the locking handle to hold the saw's position. Due to the interaction between the lever and the detent, however, the prior art arrangements do not allow for a fine adjustment that is near one of the predetermined detent positions.

One example of the prior art is disclosed in U.S. Pat. No. 5,337,641 (Duginske), which discloses a microadjuster mounted to a flip stop assembly on a T-shaped slot in the track of a miter saw. The microadjuster is adjustably secured to the track, such that the rotation of a bolt moves the flipstop assembly either away from or toward a work piece depending on the rotation of the bolt. The flipstop can then be locked into position on the track. As can be easily seen, the use of a microadjuster mounted on the track of a table saw limits the size of the work piece that can be used. Furthermore, a bulky microadjuster located on top of the track of the table saw makes it difficult to use with smaller table saws or miter saws.

Another example of the prior art is disclosed in U.S. Pat. No. 5,215,296 (Adams et al.). Adams et al. discloses an apparatus for mechanical positioning, and adjustments thereof, or cutting tools such as saws. The apparatus has a microadjustable carriage for use with a work piece such that the carriage rotates relative to the base and moves objects attached to it. Once the desired adjustment has been made, the carriage is secured to the base of the cutting tool using a clamp. One drawback of this type of prior art is its inability for use with table saws that have other than rectangular tops. It would be impossible to use this application on cutting tools having a circular base, such as miter saws.

A further example of the prior art, most notably that used with miter saws is a centering device that is disclosed in U.S. Pat. No. 5,425,294 (Ushiwata et al.). In a benchtop miter saw having a bevel function, a centering system can be used for a zero-tilt angle of the position of cut or for the often-used 45-degree angle of cut. The centering system has a detent lever engaging the worktable at preselected positions for changing the angle of cut. They do not, however, provide a mechanism for finely adjusting the angle of cut, such that the angle can be adjusted plus or minus a few degrees of the selected position.

As the prior art examples show, a number of disadvantages remain. First, no prior art provides a fine-adjustment mechanism for use with a cutting tool having a circular base, such as a miter saw. Those disclosing the use of a lever to position a cut fail to provide a mechanism for microadjustments. Furthermore, it is difficult to finely adjust the lever as the lever normally engages a recess in a worktable. As the lever moves within a few degrees of the recess in a worktable, the lever naturally propagates into the recess making it very difficult for microadjustments. Second, the prior art does not provide for an easy method of making a fine adjustment as most fine adjustments are bulky or must be clamped into position. Finally, the prior art microadjustment mechanisms, because of the number of parts needed to create the device, are not economically viable.

Therefore, what is needed is a fine-adjustment mechanism whereby the user can quickly and easily make slight adjustments to the angle of cut. What is further needed is a fine-adjustment mechanism that is smaller, more efficient and more economical. What is further needed is a fine-adjustment mechanism for use with a variety of saws, such as miter saws and table saws, such that the cutting tool can be quickly adjusted for a specific angle of cut.

BRIEF SUMMARY OF THE INVENTION

The present invention satisfies the need for an economical and efficient fine-adjustment system for use with a variety of saws, including a miter saw. The present invention provides a fine-adjustment mechanism that is attached to a lever such that the lever and the cutting tool can finely adjust the angle of cut.

The present invention provides a lever having an insert for making fine adjustments of an angle of cut. The insert is attached to the lever via a yoke. The yoke is mounted to the lever and has two opposing sidewalls. The insert is movable along a threaded rod between the two opposing sidewalls, the rod having a knob on one end for finely adjusting the insert. As the knob is rotated, the insert moves laterally along the threaded rod, thus rotating the cutting tool into a slightly different position of cut. The fine-adjustment mechanism adjusts the angle of the cut a few degrees in either direction and is limited only by the distance between the two opposing sidewalls of the yoke as will be appreciated by one of ordinary skill in the art.

The invention also involves an angle adjustment mechanism for angularly adjusting a turntable that is rotatably mounted to a base, where the turntable supports a cutting tool. The adjustment mechanism includes a lever pivotally mounted to the turntable; the lever includes a yoke with opposed sidewalls that are separated by a distance. A threaded rod extends through the sidewalls of the yoke in a direction parallel to a tangent of the turntable, and an insert is located between the sidewalls. The insert has a shape suitable to engage a recess of the base and a threaded bore extends through the insert. The rod extends through the bore in threaded relation with the insert so that rotation of the rod causes lateral movement of the insert along the rod between the sidewalls, in turn resulting in angular adjustment of the turntable relative to the base.

In an embodiment, the invention also involves an apparatus that includes a base having at least one recess; a turntable rotatably mounted to a base, the turntable supporting a cutting tool; a mechanism for angularly adjusting the turntable relative to the base, the mechanism comprised of a lever pivotally mounted to the turntable, the lever including a yoke with opposed sidewalls separated by a distance; a threaded rod that extends through the sidewalls of the yoke; and an insert located between the sidewalls, the insert having a shape suitable to engage a recess of the base, the insert having a threaded bore extending therethrough, the rod extending through the bore in threaded relation so that rotation of the rod causes lateral movement of the insert along the rod between the sidewalls, in turn resulting in angular adjustment of the turntable relative to the base.

In an embodiment, the invention also involves an apparatus that includes a base having at least one recess; a turntable rotatably mounted to a base, the turntable supporting a cutting tool; an angular-adjustment lever pivotally mounted to the turntable, the angular-adjustment lever having a first insert proximal to the turntable, the first insert capable of engaging the at least one recess; a fine-adjustment mechanism mounted to the turntable, the fine-adjustment mechanism comprised of a fine-adjustment lever pivotally mounted on the turntable and including a plurality of notches; a second insert having an opening therethrough, the second insert supported by the fine-adjustment lever and adapted to engage the at least one recess; a threaded rod supported by the fine-adjustment lever and extending through the opening in the second insert; and a latch holder attached to the turntable, the latch holder containing a spring secured by a retainer plate and a latch having; a plurality of protrusions capable of mating with the plurality of notches in the fine-adjustment lever.

The above advantages, features and aspects of the present invention are readily apparent from the following detailed description, appended claims and accompanying drawings.

DETAILED DESCRIPTION OF THE INVENTION

Figure 1:
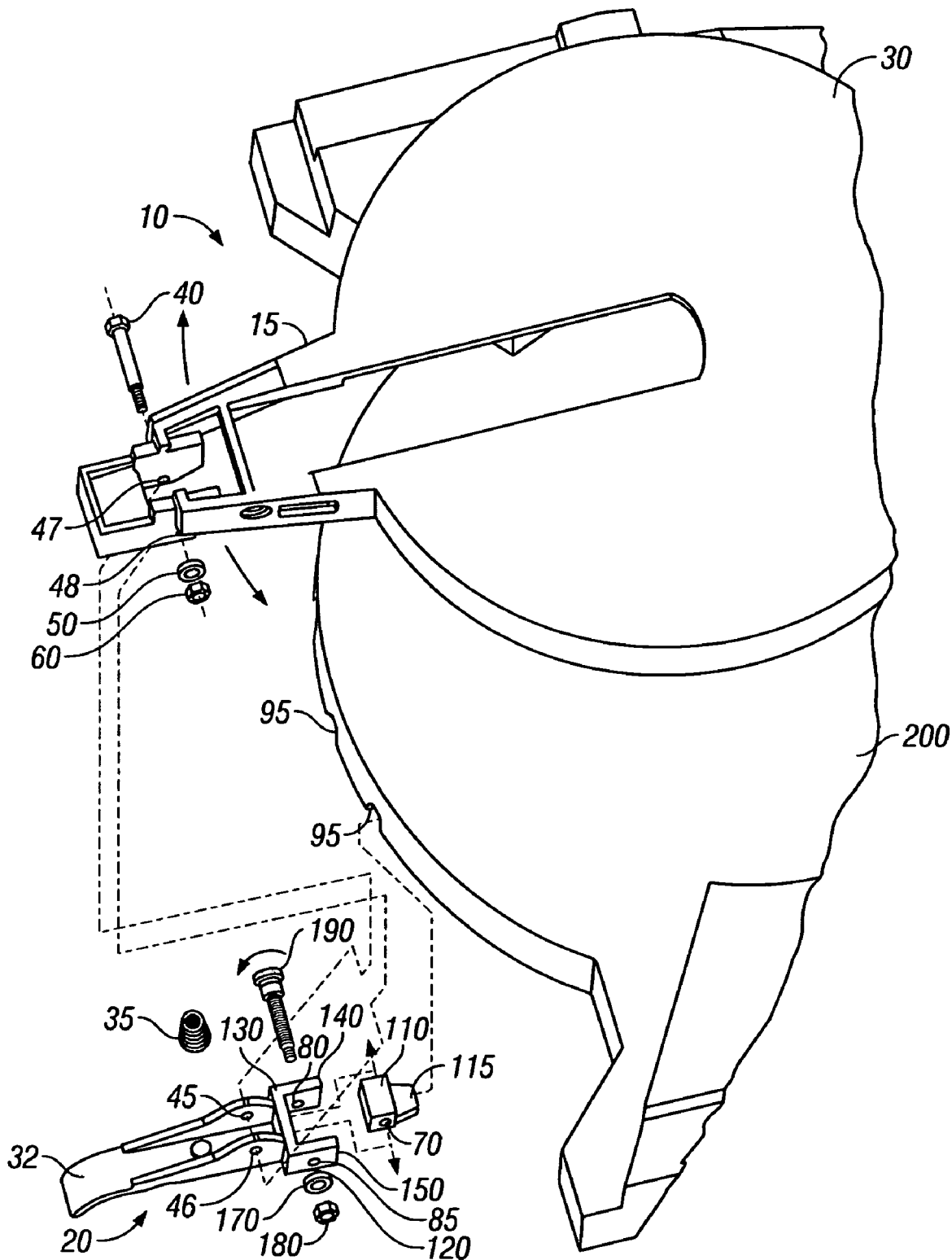
FIG. 1 is a fragmentary exploded perspective view of components of a miter saw including a miter cut fine-adjustment mechanism according to the present invention.

Turning first to FIG. 1, there is illustrated, in accordance with a first embodiment of the present invention, a miter saw assembly 10. The miter saw assembly 10 includes a stationary base 200 and a turntable 30 that is rotatably mounted to the base 200. A cutting tool (e.g., power saw) is mounted to the turntable 30 so that rotation of the turntable 30 with respect to the base 200 in turn moves the cutting tool to a desired miter angle. The rotatable turntable 30 has a forwardly extending arm portion 15 to which a movable lever 20 is secured. The lever 20 is operable to selectively engage one of several recesses 95 in the base 200 to lock the turntable 30 relative to the base 200 at a selected angle of cut. In an embodiment, each of the recesses 95 is positioned to correspond to a particular angle for a common miter, e.g., 0°, 15°, 30°, 45°, etc.

FIGS. 1–5 illustrate a lever 20 including an elongate lever body portion and a yoke portion 120 at an end of the lever body. A pair of openings 45, 46 are disposed through the lever body near an upper edge 130 of the yoke 120. The yoke 120 has two opposing sidewalls 140, 150, each opposing sidewall 140, 150 substantially perpendicular to the upper edge 130. An insert 110 is positioned between the opposing sidewalls 140, 150.

Figure 5:
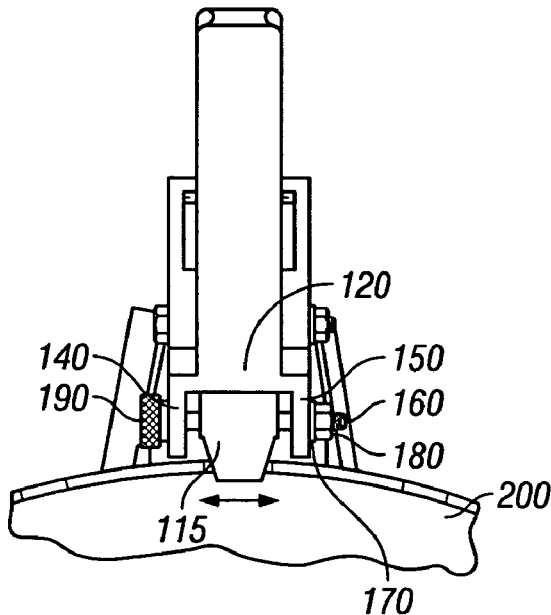
FIG. 5 is a fragmentary base view of the miter cut saw of FIG. 4.
Figure 7:
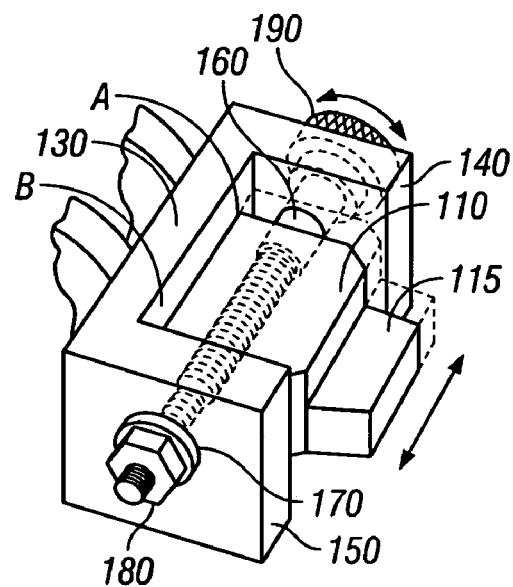
FIG. 7 is a fragmentary perspective view of a miter cut fine-adjustment mechanism for use with a cutting tool illustrating the rotational direction of the fine-adjustment knob according to the present invention.
Figure 8:
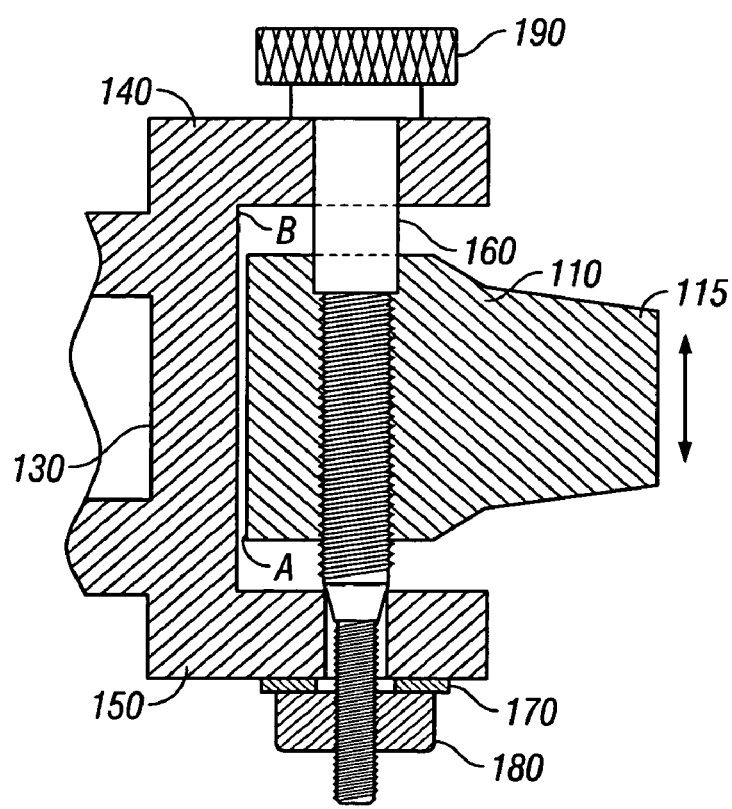
FIG. 8 is a sectional view as taken generally along line VIII—VIII of FIG. 7, including an arrow to indicate a direction of lateral movement of the insert.

According to an aspect of the invention, the insert 110 is laterally movable between the sidewalls 140, 150 for finely adjusting the turntable 30 with respect to the base 200. For example, the insert 110 has a threaded cavity 70 and each opposing sidewall 140, 150 has an aperture 80, 85 therethrough for receiving a threaded rod 160. The threaded rod 160 extends through the first aperture 80, passes through the threaded cavity 70 of the insert 110 and continues through the second aperture 85. As illustrated in FIGS. 5, 7 and 8, the insert 110 is laterally movable along the threaded rod 160 between the opposing sidewalls 140, 150. A washer 170 and a nut 180 secure one end of the rod 160 to the outer area of the other opposing sidewall 150, such that the knob 190, when rotated about the axis of the rod 160, can move the insert 110 laterally along the rod 160. The insert 110 moves in a direction toward either opposing wall 140, 150 as determined by the rotational movement of the knob 190 with respect to the rod 160 as shown in FIG. 7. The insert 110 has a wall A that is in close proximity to a wall B of yoke 120, as shown in FIGS. 7 and 8. During rotation of the knob 190, the proximity of wall A to wall B prevents the insert 110 from rotating.

Figure 6:
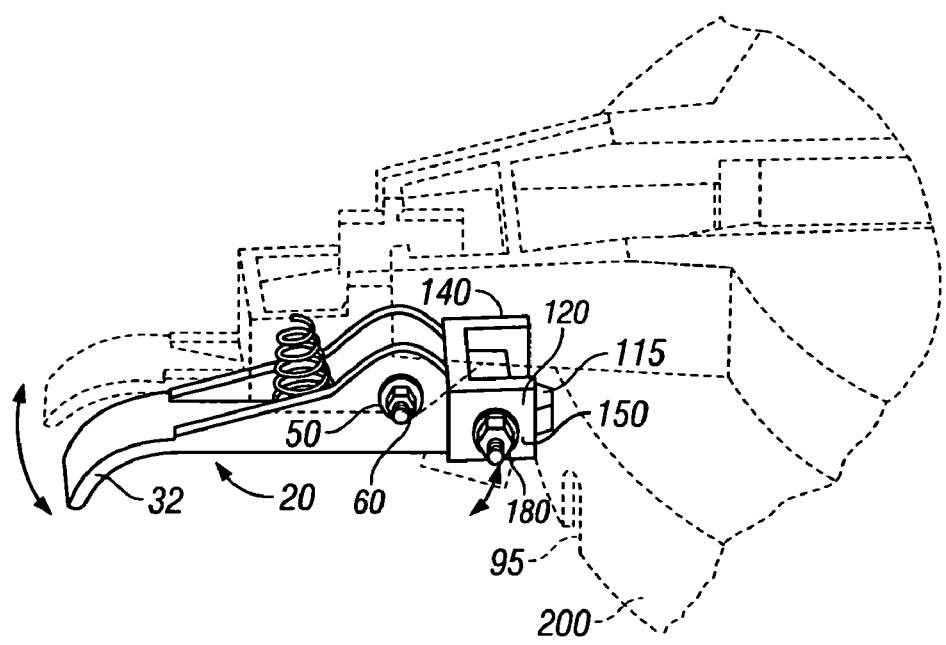
FIG. 6 is a perspective view of the miter cut fine-adjustment mechanism illustrating positions of movement of the handle.

The insert 110 has a protuberance 115, which extends in a direction generally toward the base 200, permitting the lever 20 to be detachably secured to a recess or slots 95 in the base 200 for selecting a different angle of cut. By squeezing the handle 32, a user can pivot the lever 20, as shown in FIG. 6, so that the insert 110 moves out of the recess 95, thereby permitting the turntable 30 to be rotated to a desired angle. Upon releasing the lever 20 (which is biased to urge the insert toward the base), the insert 110 can engage another recess 95 with which the turntable 30 is aligned.

When the general cut angle has been selected by rotating the turntable and engaging the insert 110 in one of the recesses 95, the knob 190 can then be rotated in either direction for finely adjusting the selected angle of the arm 15 and, as a result, the angle of the cut along the plane of the base 200. This adjustment results from the insert 110 moving along the length of the threaded rod 160 until the insert 110 abuts a sidewall 140, 150 of the yoke 120. Although the insert 110 is moving along the threaded rod 160 with respect to arm 15, it is remaining stationary in the selected recess 95 of the base 200. The movement of the insert 110 along the threaded rod 160, however, causes the angle of the lever to be finely adjusted, in an embodiment, to approximately ±2½° from the general cutting angle (e.g., 0°, 15°, 30°, 45°, etc.).

The degree of fine adjustment of the lever 20 is limited only by the length between the two opposing sidewalls 140, 150 of the yoke 120. As will be appreciated by one of ordinary skill in the art, the greater the distance between the opposing sidewalls 140, 150, the greater the degree of fine adjustment of the lever 20 and subsequently the cutting tool.

Figure 2:
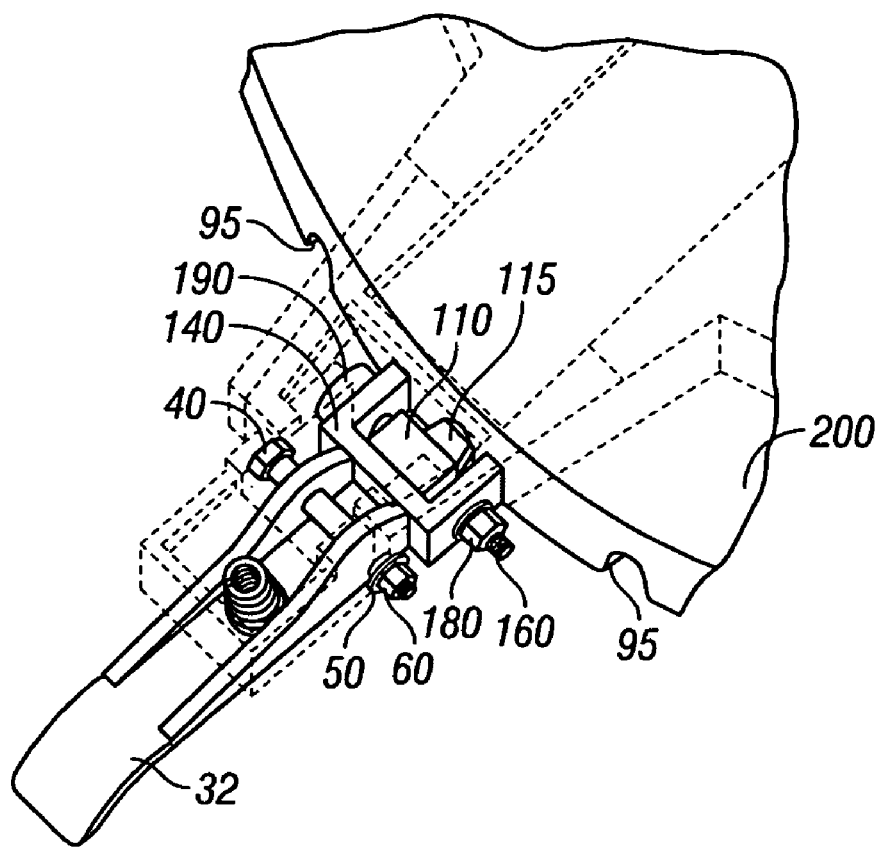
FIG. 2 is a fragmentary perspective view of the miter saw of FIG. 1, the turntable shown in phantom to illustrate the miter cut fine-adjustment mechanism.

As is illustrated in FIGS. 1 and 2, there is provided a bolt 40 for securing the lever 20 to the extending arm portion 15 of the turntable 30. The lever 20 has a pair of openings 45, 46 that are aligned with a pair of openings 47, 48 on the outwardly extending arm portion 15. The lever 20 is secured to the outwardly extending arm portion 15 of the turntable 30 with the bolt 40, a washer 50 and a nut 60. The bolt 40 has a threaded end and extends through the pair of openings 47, 48 of the outwardly extending arm 15 of the turntable 30 and through the pair of openings 45, 46 of the lever 20. The washer 50 and nut 60 threadably receive the bolt 40, thereby securing the lever 20 to the turntable 30, such that the turntable 30 and the cutting tool carried thereon are rotationally movable for selecting a desired miter angle of cut.

The lever 20 may further have a spring 35 attached to the lever 20 for biasing the lever 20 and the extending arm 15 of the turntable 30.

Figure 4:
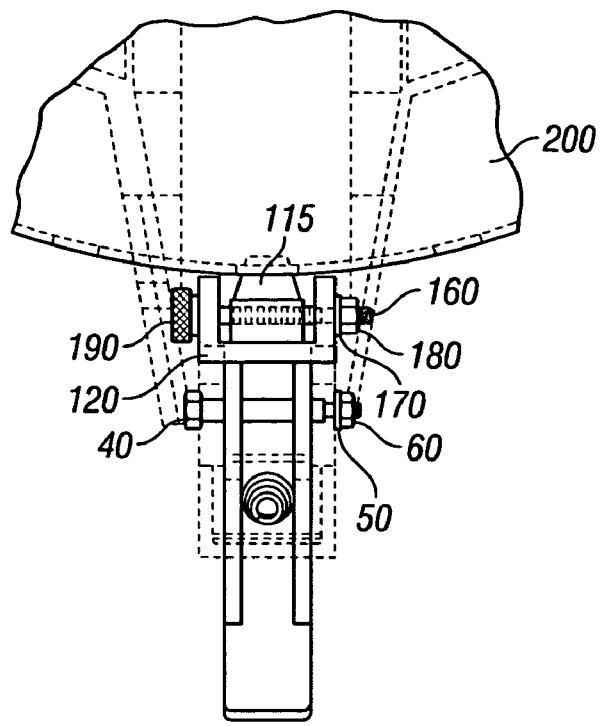
FIG. 4 is a fragmentary plan view of the miter saw of FIG. 3.

In an embodiment, the invention involves a mechanism for angularly adjusting a turntable 30 that is rotatably mounted to a base 200. The adjustment mechanism includes a lever 20 pivotally mounted to the turntable 30. The lever 20 includes a handle portion 32 distal of the base 200 and an insert portion 110 proximal to the base 200. In an embodiment as shown in FIGS. 1 and 4, a bolt 40 pivotally connects the handle portion 32 and the insert portion 110 to the turntable 30 in such a manner that when a user squeezes the handle 32 upward the insert portion 110 is disengaged from a recess 95 in the base 200.

The lever 20 includes a yoke 120, as shown in FIGS. 5, 7 and 8, with opposed sidewalls 140, 150 that are separated by a distance. The mechanism also includes a threaded rod 160 that extends through the sidewalls 140, 150 of the yoke 120. In an embodiment, the rod 160 is aligned in a direction parallel to a tangent of the turntable 30. The mechanism further includes an insert 110 positioned generally between the sidewalls 140, 150 of the yoke 120. The insert 110 has a shape suitable to engage a recess 95 of the base 200 and a threaded bore extends through the insert 110. The rod 160 extends through the bore in threaded relation with the insert 110 so that rotation of the rod 160 causes lateral movement of the insert 110 along the rod 160 between the sidewalls 140, 150, in turn resulting in angular adjustment of the turntable 30 relative to the base 200.

Figure 3:
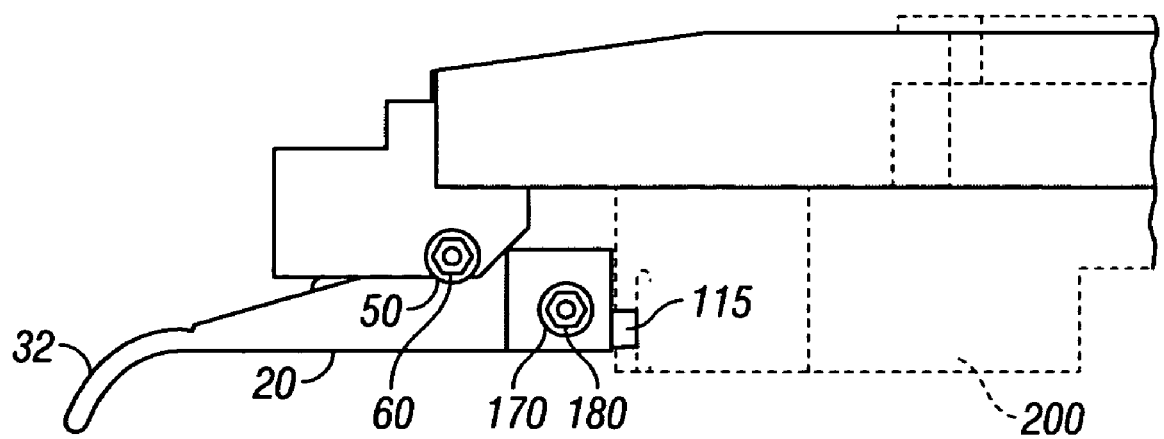
FIG. 3 is a fragmentary side view of the miter saw of FIG. 2.

Pivotal motion of the lever 20 moves the insert 110 selectively in and out of engagement with one of the recesses 95. The lever 20, in an embodiment, is mounted to the turntable 30 to pivot on an axis parallel to the threaded rod 160. The lever 20 is generally elongate in shape, and is pivotally mounted to the turntable 30 at a point located intermediate the length of the lever 20, as shown in FIG. 3. In an embodiment, a knob 190 is attached to an end of the threaded rod 160.

In order to operate the mechanism, in an embodiment, a user raises the outward end of the lever 20 toward an arm 15 that extends outwardly from the turntable 30. This raising of the outward end causes lever 20 to pivot, thus allowing the insert 110 to be withdrawn from a recess 95 of the base 200. Once the insert 110 is withdrawn, the user then rotates the turntable 30 with respect to the base 200 until the insert 110 is positioned at a second recess 95 of the base 200. The user then releases the outward end of the lever 20 causing the inboard end of the lever 20 to pivot upward, thereby seating the insert 110 within the second recess 95.

Because the recesses 95 are spaced apart at angular intervals, for example, 15° intervals, the user must be able to finely adjust the insert 110 so that cutting angles between the 15° intervals may be obtained. This is done, in an embodiment, by rotating the threaded rod 160 that extends through the insert 110. Rotation of the threaded rod 160 causes the insert 110 to move laterally with respect to the recess 95 in the base 200, thereby causing the angle of the cut to be adjusted ever so slightly. This slight adjustment results in more precise cuts.

In an embodiment, the invention involves an apparatus 10, as shown in FIG. 1, that has a base 200 having at least one recess 95. A turntable 130 that supports a cutting tool is rotatably mounted to a base 200. The apparatus 10 also includes a mechanism for angularly adjusting the turntable 30 relative to the base 200. The mechanism includes a lever 20 pivotally mounted to the turntable 30. The lever 20 includes a yoke 120 with opposed sidewalls 140, 150 separated by a distance. A threaded rod 160 extends through the sidewalls 140, 150 of the yoke 120, and an insert 110 is located between the sidewalls 140, 150. The insert has a shape suitable to engage a recess 95 of the base 200. The insert also includes a threaded bore that extends through the insert 110. The rod 160 extends through the bore in threaded relation so that rotation of the rod 160 causes lateral movement of the insert 110 along the rod 160 between the sidewalls 140, 150, in turn resulting in angular adjustment of the turntable 30 relative to the base 200.

In an embodiment, the base 200 includes multiple recesses 95 corresponding to respective angular positions of the turntable 30 with respect to the base 200. Pivotal motion of the lever 20 moves the insert 110 selectively in and out of engagement with the recess 95. In an embodiment, the lever 20 is mounted to the turntable 30 so as to pivot on an axis parallel to the threaded rod 160. In an embodiment, the lever 20 is generally elongate in shape and is pivotally mounted to the turntable 30 at an intermediate point thereof. In an embodiment, a knob 190 is attached to an end of the threaded rod 160. In an embodiment, the threaded rod 160 extends through the sidewalls 140, 150 in a direction perpendicular to the sidewalls 140, 150.

Figure 9:
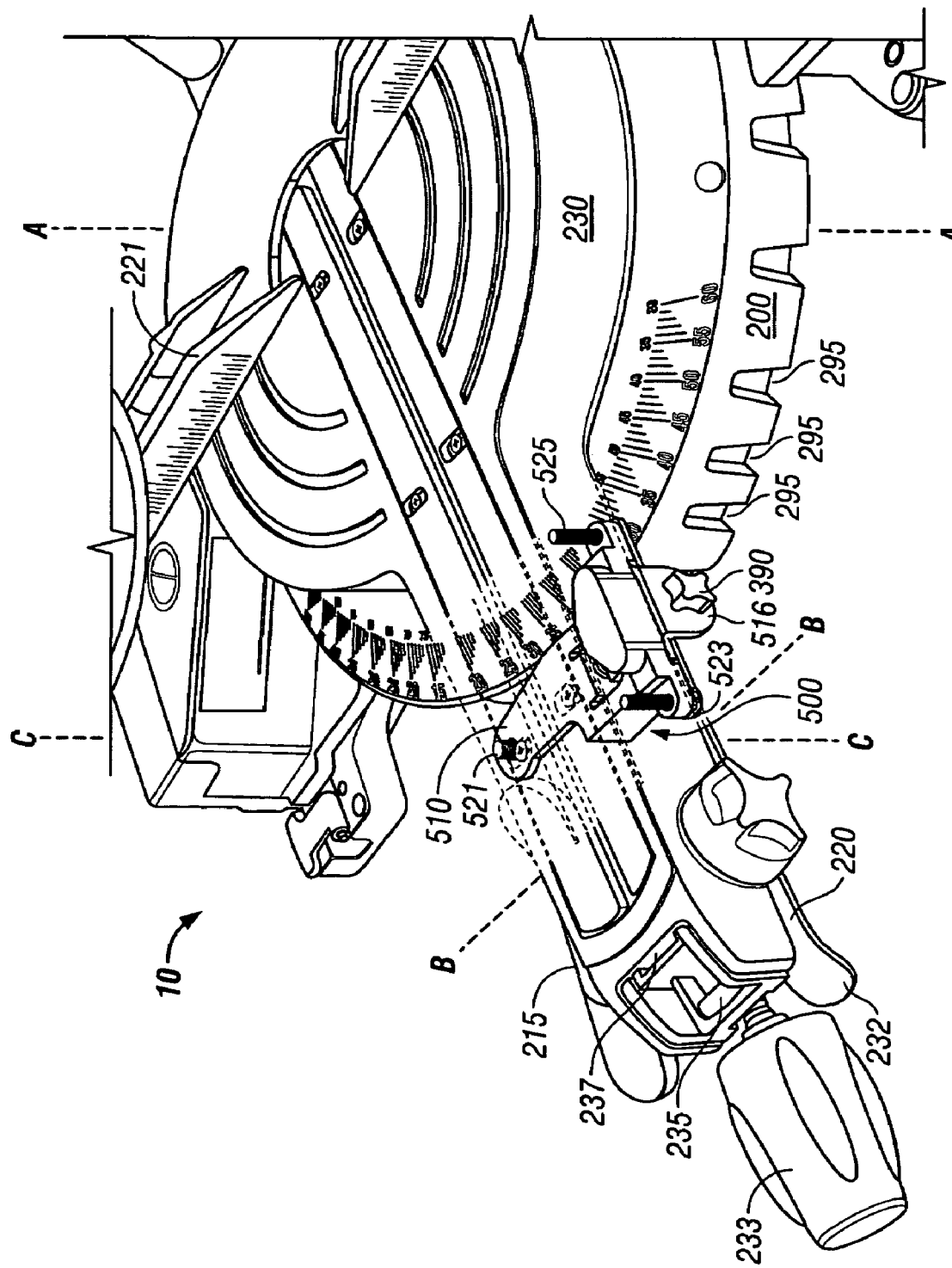
FIG. 9 is a fragmentary perspective view of a turntable used with a miter saw showing the fine-adjustment mechanism attached to the bottom of the turntable arm.
Figure 10:
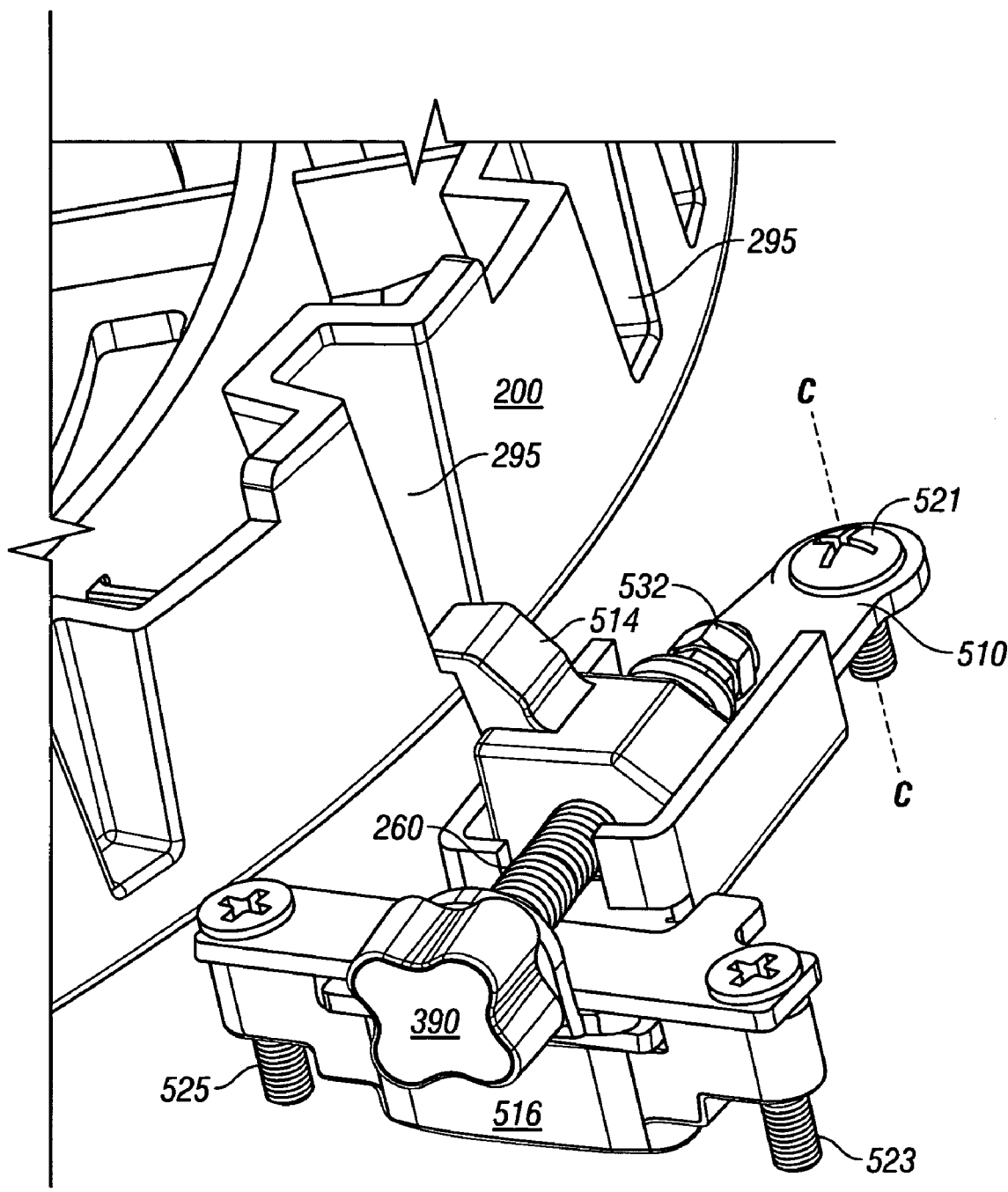
FIG. 10 is a perspective view showing the base view of the fine-adjustment mechanism in the engaged position.
Figure 15:
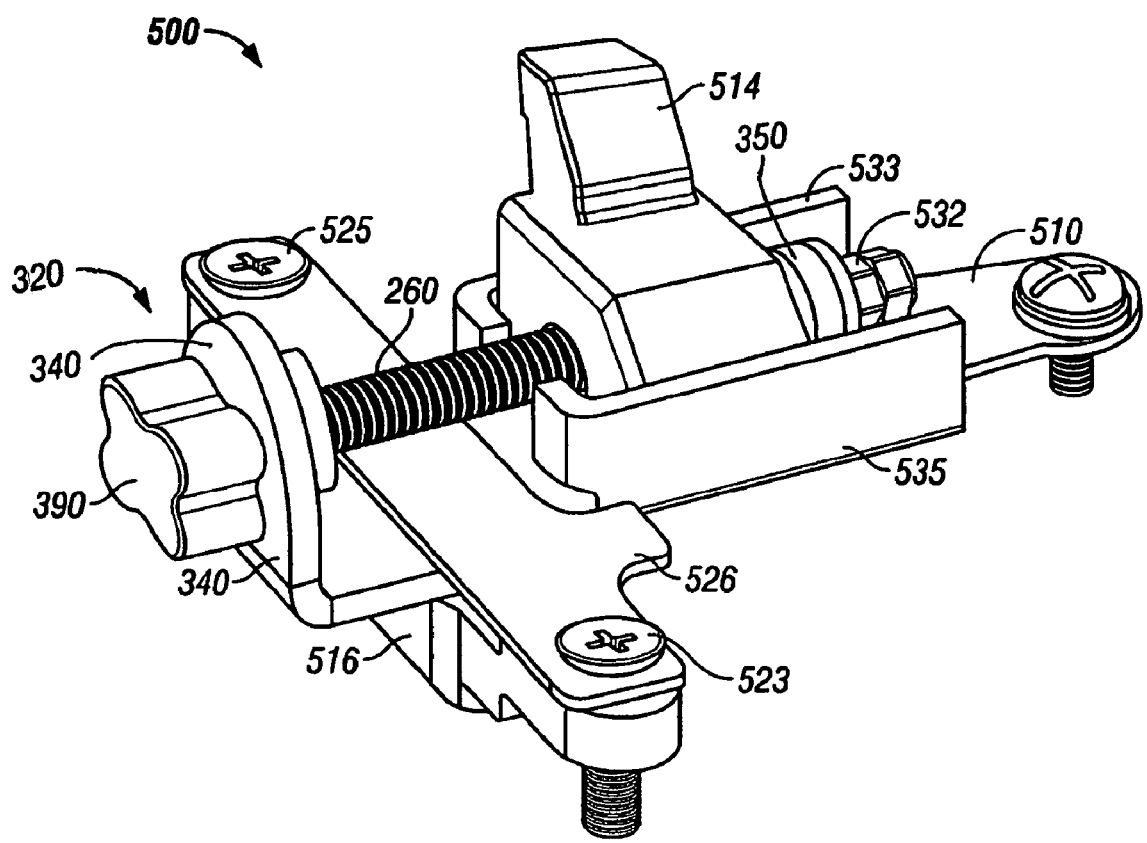
FIG. 15 is a perspective view of the underside of the fine-adjustment mechanism.
Figure 16:
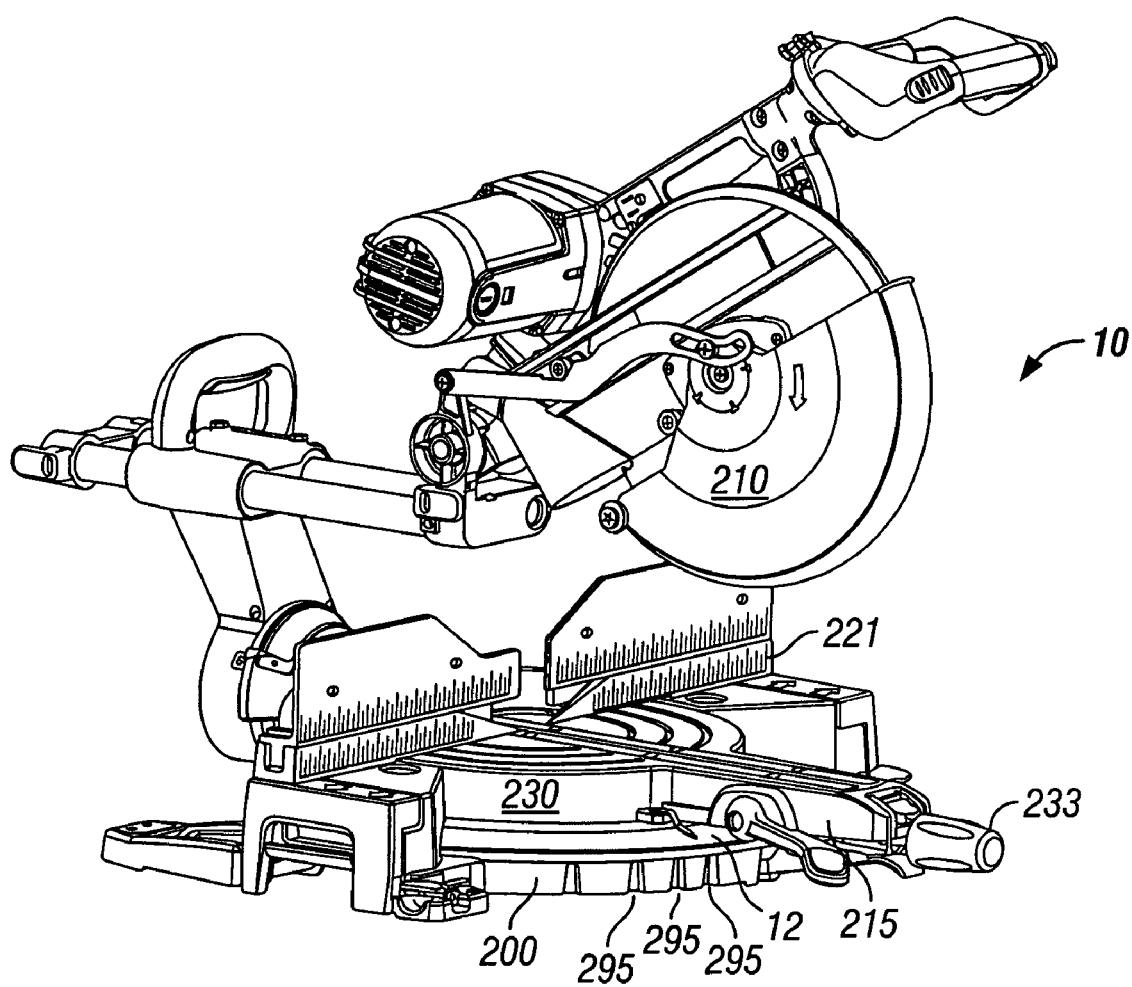
FIG. 16 is a perspective view of a dual-bevel sliding miter saw.
Figure 17:
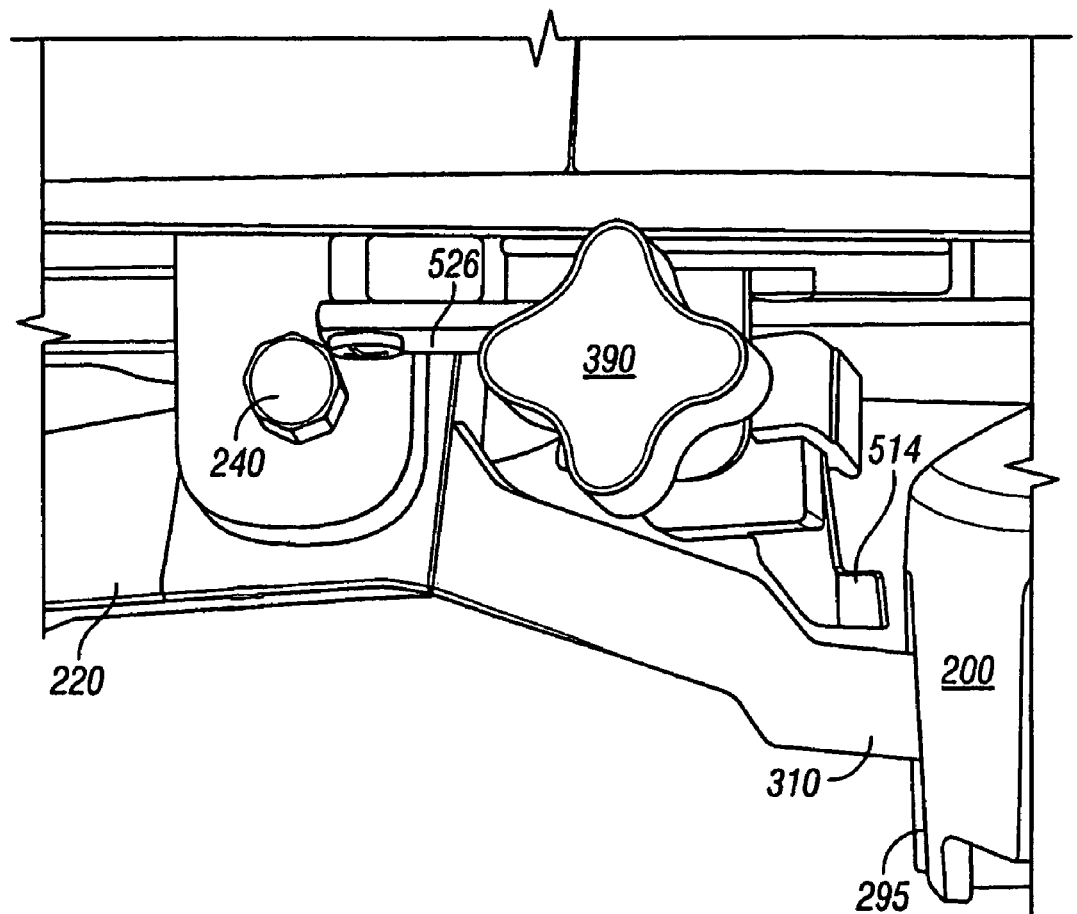
FIG. 17 is a side view of the lever showing the fine-adjustment mechanism attached to the bottom of the arm of the turntable and both the first and second inserts.
Figure 18:
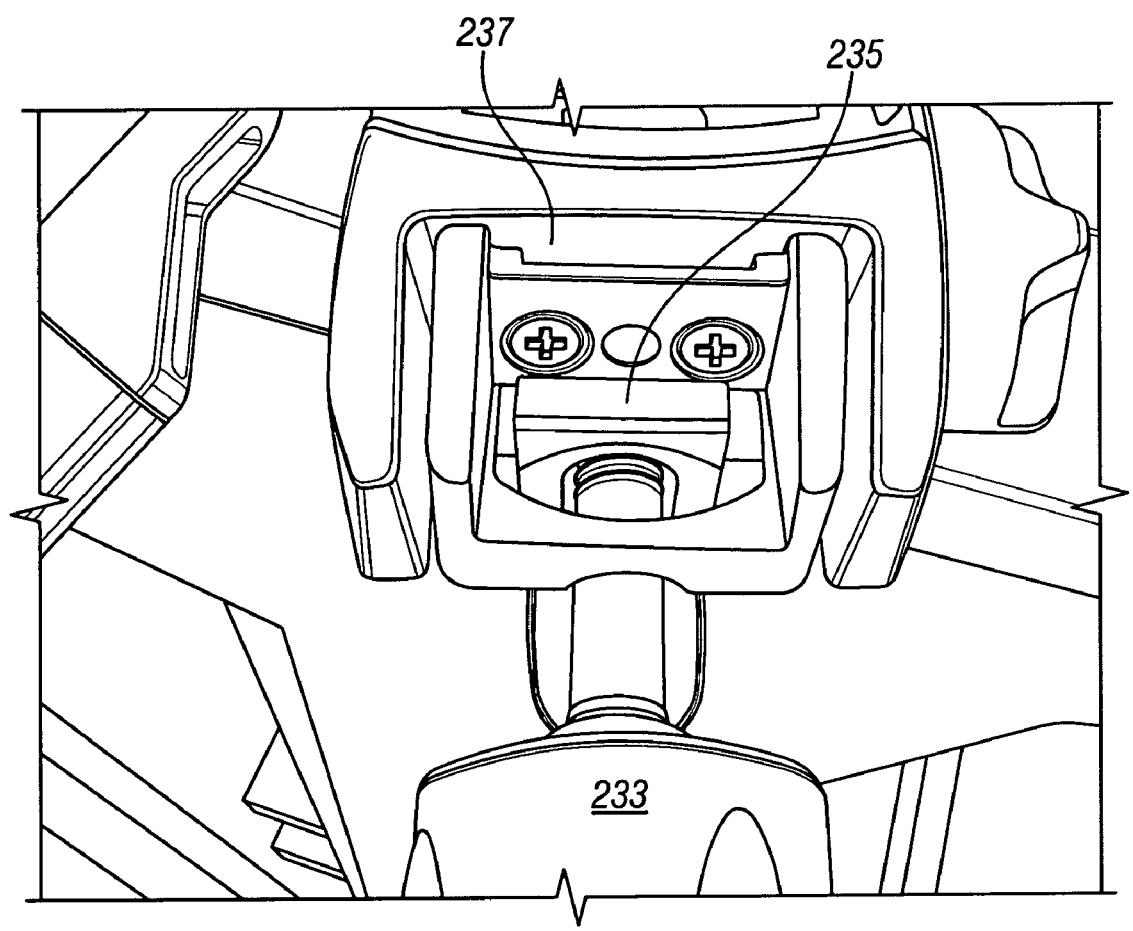
FIG. 18 is a perspective view of the override clip showing the clip in the retracted position.
Figure 19:
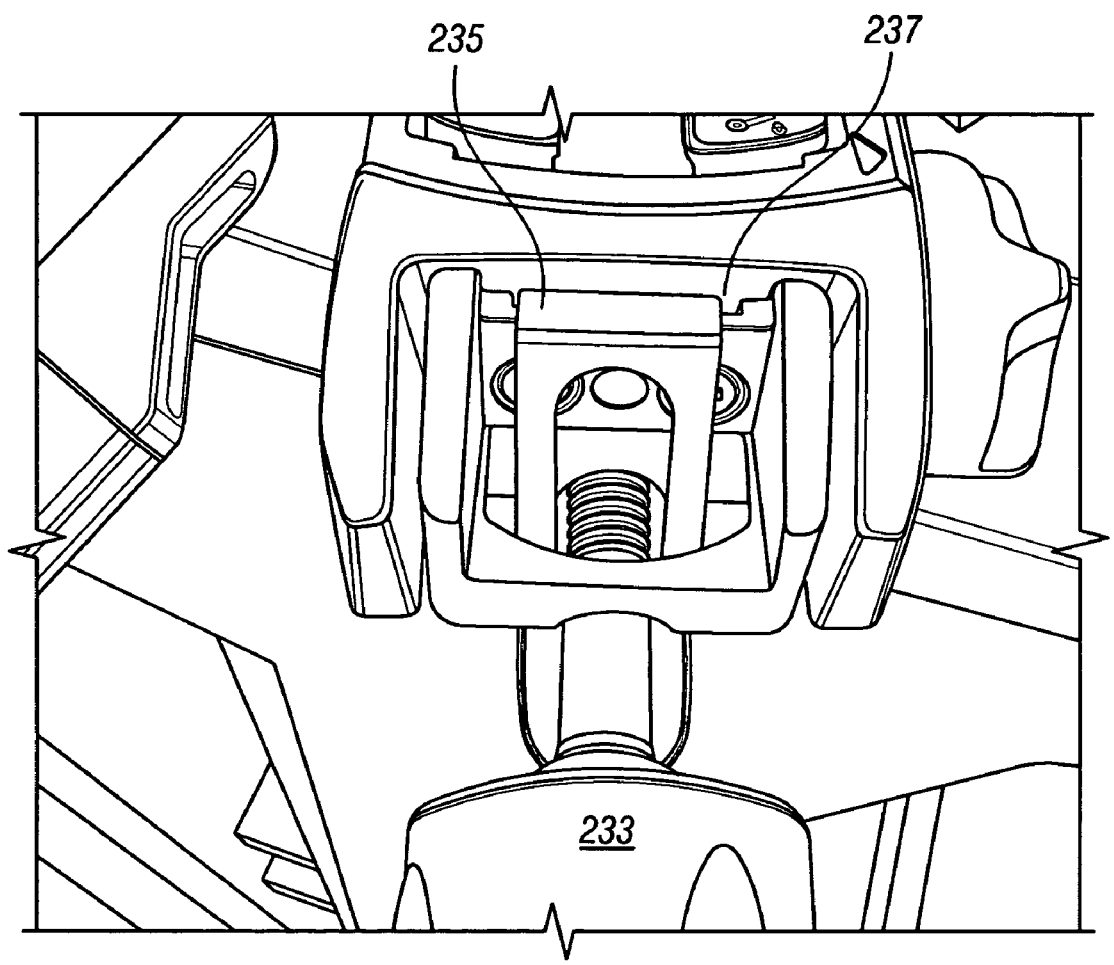
FIG. 19 is a perspective view of the override clip showing the clip in the extended and locked position.

Of course, the embodiments described above in connection with FIGS. 1–8 are merely an example. Another exemplary embodiment will be now described in connection with FIGS. 9–20. FIGS. 9 and 16 show a miter saw similar to the kind used with the invention. A typical miter saw has a turntable 230 mounted on a base 200 in such a manner that the turntable 230 is allowed to rotate with respect to the base 200. Mounted to the turntable 230, as shown in FIG. 16, is a cutting tool 210, preferably a circular saw, and a fence 221 against which an object to be cut is placed. As shown in FIGS. 9, 10, 12, 13, 16 and 20, miter saws typically include a detent system 295 that allows the turntable 230 and the attached cutting tool 210 to be preset to specific angles relative to the fixed fence 221. This detent system 295 provides an accurate means to preset and reset the saw to make the most popular cuts (e.g., 15°, 30° and 45°).

Figure 20:
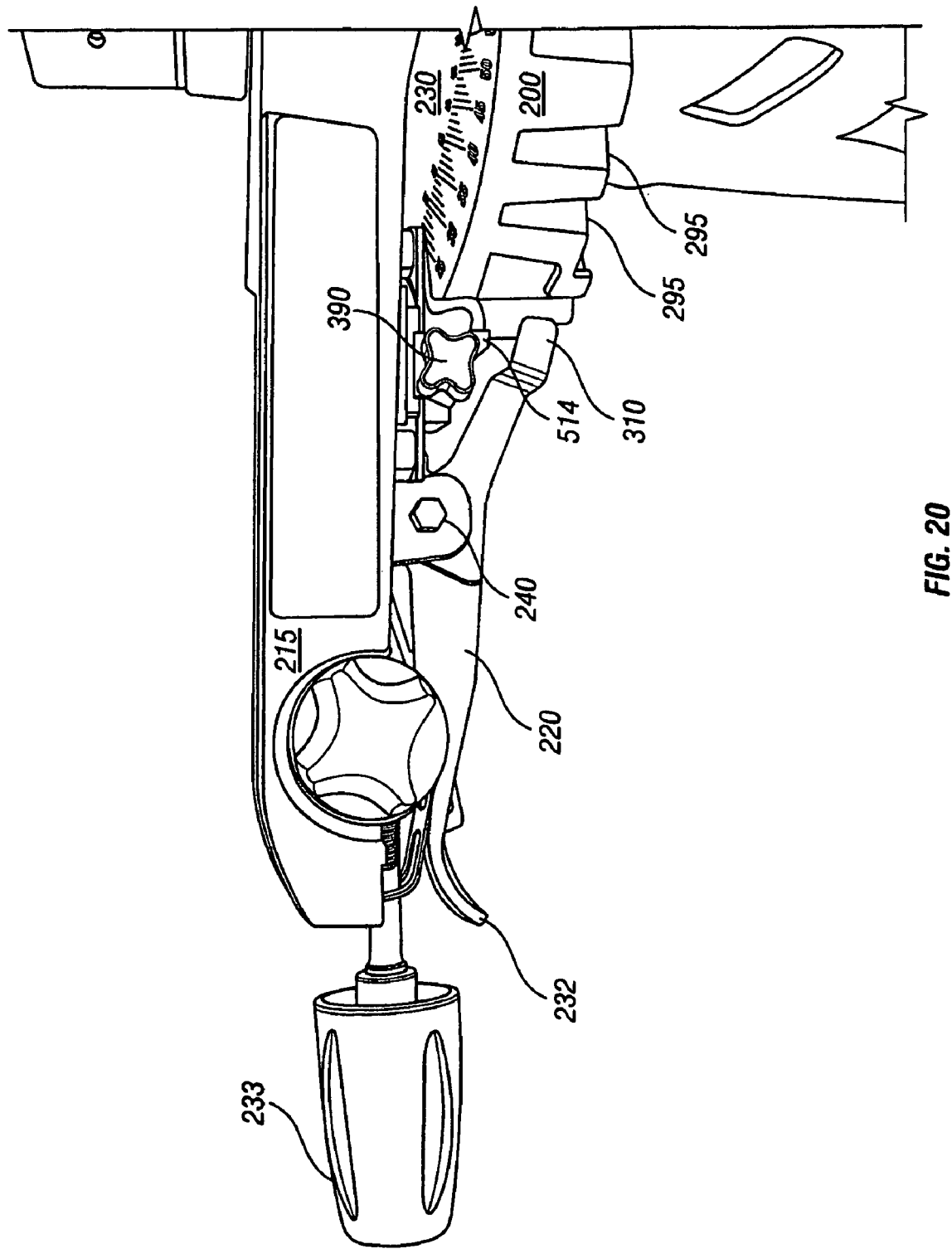
FIG. 20 is a side view of the turntable arm showing the angular-adjustment lever and the fine-adjustment mechanism mounted below the arm.

In an embodiment, an arm 215 extends from the turntable 230. As shown in FIG. 20, the arm 215 supports a screw-type lock handle 233 that is engaged with the base 200. The loosening of the lock handle 233 allows the turntable 230 to rotate with respect to the base 200. The lock handle 233 may be of a rotating screw-type or lever cam-type design. In order to indicate the saw's preset cutting position, the turntable 230 supports a pointer 12, as shown in FIG. 16, that relates to an angle scale on the fixed base 200.

As shown in FIG. 20, a lever 220 that includes a retractable detent insert 310 is pivotally mounted below the arm 215 of the turntable 230. A bolt 240 may be used to secure the lever 220 to the arm 215. The base 200 typically has a rounded front shape that is concentric with the table and includes recesses 295 that form detent holes or slots positioned to accept the detent insert 310 or wedge. The lever 220 bears against the rounded front of the base 200 outside of the detent slot 295 or hole locations. Upon engaging a detent slot 295, the lever 220 springs the insert 310 into the detent slot 295.

Figure 14:
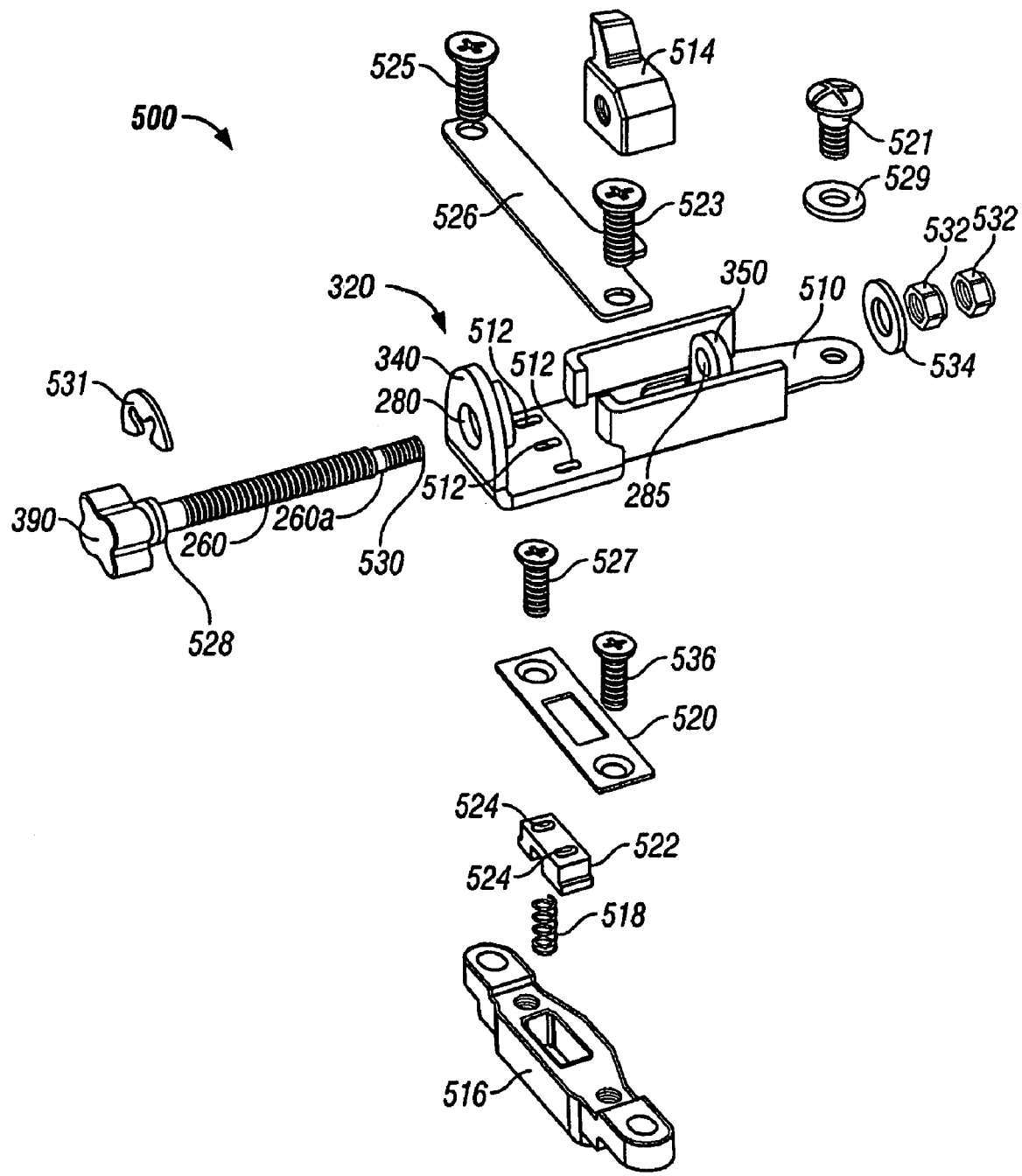
FIG. 14 is an exploded view of the fine-adjustment mechanism.

In an embodiment, as shown in FIG. 9, the invention also involves a miter saw comprised of a base 200 having at least one recess 295. A turntable 230 that supports a cutting tool is rotatably mounted to a base 200. An angular-adjustment lever 220 is pivotally mounted to the turntable 230. The angular-adjustment lever includes a first insert 310 proximal to the turntable 230. The first insert 310 is capable of engaging the at least one recess 295. A fine-adjustment mechanism 500 is also mounted to the turntable 230. As shown in FIGS. 9, 14 and 15, the fine-adjustment mechanism 500 includes a fine-adjustment lever 510 pivotally mounted on the turntable 230. A second insert 514 having an opening therethrough is supported by the fine-adjustment lever 510 and adapted to engage the at least one recess 295 of the base 200. A threaded rod 260 supported by the fine-adjustment lever 510 extends through the opening in the second insert 514.

When in use, the locking handle 233 is rotated so as to allow the turntable 230 to rotate with respect to the base 200. Once the locking handle 233 is loosened, the operator raises the handle portion 232 of the lever 220, thereby disengaging the first insert 310 and raising the override clip 235, shown in FIGS. 9, 18, 19 and 20, such that clip 235 is aligned in front of retaining slot 237. The operator then presses the override clip 235 into the retaining slot 237 and releases the handle portion 232 of the lever 220, thereby allowing the turntable 230 to rotate freely with respect to the base 200. This allows the operator to realign the turntable with any of the recesses 295 in the base.

Figure 11:
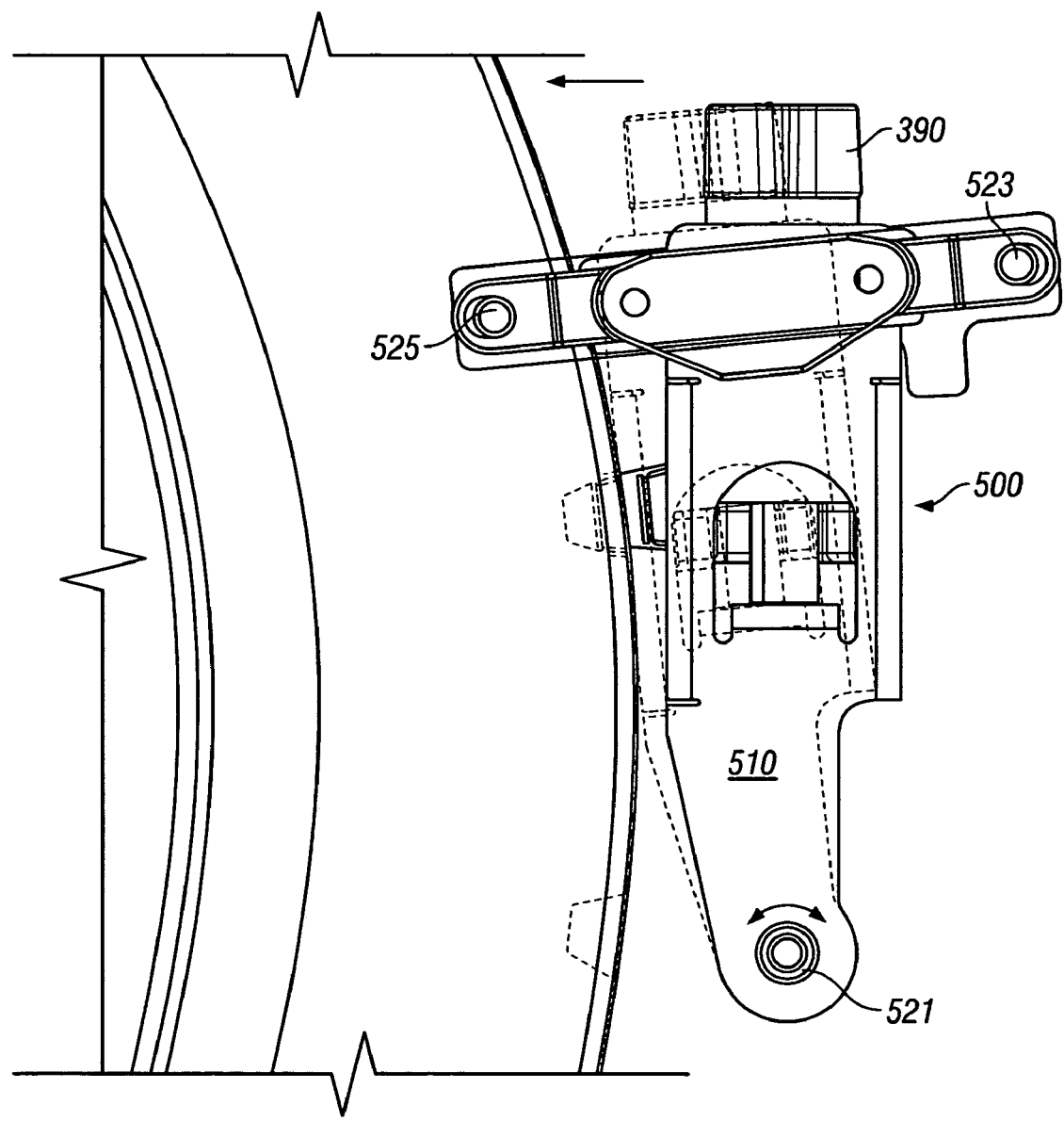
FIG. 11 is a plan view of the fine-adjustment mechanism showing the mechanism disengaged and engaged (phantom) with the miter saw.
Figure 12:
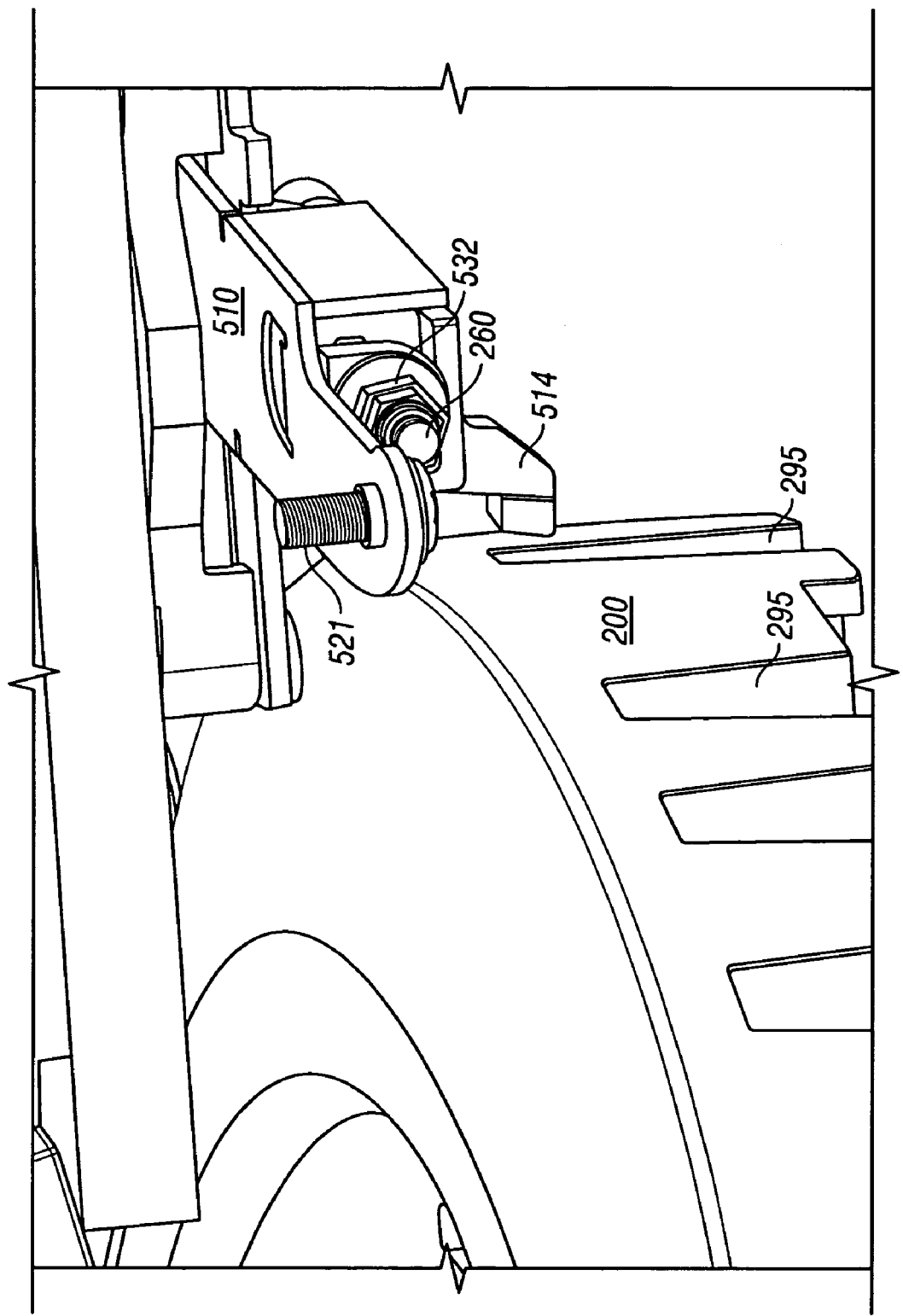
FIG. 12 is a perspective view of the fine-adjustment mechanism disengaged showing a second insert aligned with a recess in the base.
Figure 13:
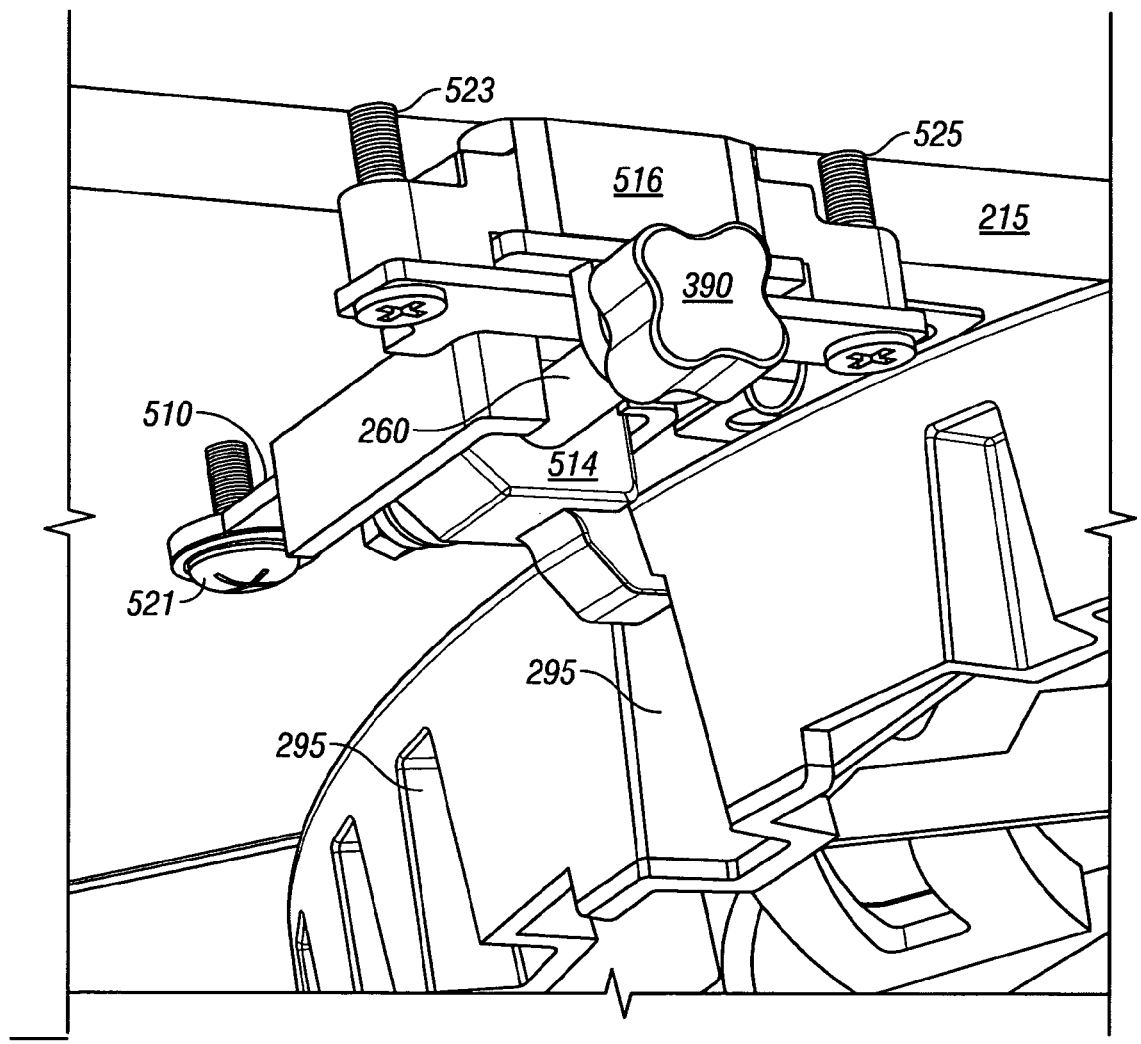
FIG. 13 is a perspective view of the underside of the fine-adjustment mechanism showing the second insert engaged with a recess in the base.

Once the turntable 230 has been aligned with the desired recess 295, the fine-adjustment mechanism 500 which, in an embodiment, is secured to an arm 215 extending from the turntable 230 is positioned so that the second insert 514 keys into the desired recess 295. The second insert 514 is positioned, as shown in FIG. 11, by pivoting the fine-adjustment lever 510 toward the turntable 230 to engage the second insert 514 in the recess 295, and away from the turntable 230 to disengage. In an embodiment, movement of the fine-adjustment lever 510 is caused by applying a slight vertical pressure to the end of the lever 510 distal to the mounting screw 521. This pressure causes the latch 522 to press against the spring 518 in the latch holder 516, thereby causing the protrusions 524 on the latch 522 to recess from within the notches 512 on the lever 510. This allows the fine-adjustment lever 510 to be repositioned, at which time the pressure is released and the protrusions 524 spring back into the notches 512 to hold the lever 510 in place.

Once the fine-adjustment lever 510 is positioned and the second insert 514 is engaged in one of the recesses 295, the cutting angle can be finely adjusted by rotating the threaded rod 260 that extends through the second insert 514. Rotation of the threaded rod 260 causes the second insert 514 to move laterally with respect to the recess 295. This causes the turntable 230 to rotate slowly on the base 200, thus allowing the cutting angle to be finely adjusted. The range of adjustment for the second insert 514 is approximately ±2½° from the center of any existing detent slot 295. Therefore, if the second insert 514 is keyed into a 45° slot, then the adjustment range is from about 42½° to 47½°.

In an embodiment, the fine-adjustment mechanism 500 includes a repress plate 526, as shown in FIGS. 14 and 15, that aligns the fine-adjustment lever 510 with the latch holder 516. The repress plate 526 holds the fine-adjustment lever 510 in contact with the latch protrusions 524 and thus restricts the movement of the fine-adjustment lever 510. Attachment screws 523, 525 such as those shown in FIGS. 9–11 and 13–15 may be used to connect the fine-adjustment lever 510 to the latch 522 and furthermore, attaches latch holder 516 to the turntable 230.

In an embodiment, the threaded rod 260 has a first end 528 having a first diameter, and a second end 530, having a second diameter that is less than the first, as shown in FIG. 14. A control knob 390 is attached to the first end 528, and a locking nut 532 attached to the second end 530 secures the threaded rod 260 to the fine-adjustment lever 510. In this embodiment, rotation of the control knob 390 causes the second insert 514 to move along a length of the threaded rod 260. In this embodiment, when the fine-adjustment mechanism 500 is engaged, a user turns the knob 390 on the end of the threaded rod 260 and the turntable 230 slowly rotates on the base 200. Again, movement of the second insert 514 results in a change of the cutting angle of the cutting tool.

In an embodiment, as shown in FIGS. 14 and 15, the fine-adjustment lever 510 defines a yoke 320. The yoke 320 includes a first sidewall 340 having a first opening 280, and a second sidewall 350 having a second opening 285. The threaded rod 260 extends through the first opening 280 and the second opening 285. As shown in FIG. 14, an e-clip 531 can be used to hold the threaded rod 260 against the first sidewall 340. This e-clip 531, in conjunction with the locking nut 532 attached to the second end 530 and abutting the second wall 350, secures the rod 260 to the fine-adjustment lever 510 while still allowing rotation of the rod 260. In an embodiment as shown in FIG. 14, the threaded rod 260 includes a step portion 260a that reduces the diameter of the rod 260. When positioned in the opening 285 of the second sidewall 350, the step portion 260a, which is not threaded, bears against one side of the wall 350 while the locking nut 532 bears against the other side of the wall 350. In an embodiment, a washer 534 may be positioned between the locking nut 532 and the sidewall 350.

In an embodiment, the turntable 230 has an edge that defines a radius of curvature, and the threaded rod 260 has a length extending along a line tangential to the radius of curvature.

In an embodiment, the angular-adjustment lever 220 is mounted to the turntable 230 to pivot on a first axis B—B extending along the length of bolt 240 and the fine-adjustment lever 510 is mounted to the turntable 230 to pivot on a second axis C—C, as shown in FIG. 9, perpendicular to the first axis B—B. The turntable 230, which rotates around axis A—A with respect to the base 200, has an outwardly extending arm 215, and the angular-adjustment lever 220 and the fine-adjustment lever 510 are mounted to the arm.

In an embodiment, the invention involves a mechanism for adjusting a turntable 230 that is rotatably mounted to a base 200, the turntable supporting a cutting tool. The inventive mechanism is comprised of a base 200 having a means for defining a reference angle with respect to the base 200; a turntable 230 rotatably mounted to a base 200, the turntable 230 supporting a cutting tool; a first means for angularly adjusting the turntable 230 relative to the base 200, and a second means for finely adjusting the angular relation of the turntable 230 relative to the base 200 to within about ±2½° of the reference angle (e.g., 0°, 15°, 30°, 45°, etc.). The means for defining a reference angle with respect to the base 200 can include any kind of marker including, but not limited to, a notch, recess, bump, line, spike or the like.

In an embodiment, the first means includes an angular-adjustment lever 220 that extends radially from the turntable 230 and the second means includes a fine-adjustment lever 510 that pivots along an axis perpendicular to a radius of the turntable 230. Furthermore, the first means may include a first insert 310, and the second means may include a second insert 514 that is adapted to move along an axis tangential to a radius of curvature of the turntable 230.

While only a few embodiments of the miter cut fine-adjustment mechanism for use with a cutting tool of the present invention have been described and illustrated herein, it will be evident to one of ordinary skill in the art that the other embodiments may be possible without departing from the scope of the following claims.

The use of the terms "a," "an," "the" and similar referents in the context of describing the invention (especially in the context of the following claims) are to be construed to cover both the singular and the plural, unless otherwise indicated herein or clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

What is claimed is:

1. A miter saw assembly, comprising:
   a base defining a plurality of detent recesses;
   a turntable rotatable in relation to said base;
   a cutting tool operable to cut a work piece positioned on said turntable; and
   an adjustment mechanism attached to said turntable and including (i) a yoke having a first wall and a second wall that are spaced apart from each other, said first wall defining a first opening, and said second wall defining a second opening, (ii) a threaded rod extending through said first opening and said second opening, and (iii) an insert interposed between said first wall and said second wall, said insert defining an internally threaded passage through which said threaded rod extends,
   wherein said adjustment mechanism is movable between (i) a first position in which said insert is positioned in one of said plurality of detent recesses, and (ii) a second position in which said insert is spaced apart from all of said plurality of detent recesses, and
   wherein, when said adjustment mechanism is positioned in said first position, rotation of said threaded rod causes said turntable to rotate in relation to said base.

2. The miter saw assembly of claim 1, wherein:
   rotation of said threaded rod causes said insert to move in relation to said threaded rod along an axis of said threaded rod, and movement of said insert in relation to said threaded rod along said axis of said threaded rod causes said turntable to rotate in relation to said base.

3. The miter saw assembly of claim 1, wherein said adjustment mechanism further includes a control knob attached to an end portion of said threaded rod.

4. The miter saw assembly of claim 1, wherein:
said insert defines a first lateral surface, a second lateral surface, a front facing surface and a rear facing surface,
said internally threaded passage extends from said first lateral surface to said second lateral surface,
said adjustment mechanism further has a front guide wall and a rear guide wall,
said front facing surface of said insert is positioned adjacent to said front guide wall, and
said rear facing surface of said insert is positioned adjacent to said rear guide wall.

5. The miter saw assembly of claim 1, wherein said adjustment mechanism pivots between said first position and said second position about a first axis.

6. The miter saw assembly of claim 5, wherein:
said threaded rod defines a second axis, and
said first axis is substantially perpendicular to said second axis.

7. An assembly, comprising:
a base defining a plurality of detent recesses;
a turntable rotatable in relation to said base;
a cutting tool operable to cut a work piece positioned on said turntable; and
an adjustment mechanism including (i) a first wall defining a first opening, (ii) a second wall spaced apart from said first wall and defining a second opening, (ii) a threaded rod extending through said first opening and said second opening, and (iii) a detent member interposed between said first wall and said second wall, said detent member defining an internally threaded passage through which said threaded rod extends,
wherein said adjustment mechanism is movable between (i) a first position in which said detent member is positioned in one of said plurality of detent recesses, and (ii) a second position in which said detent member is spaced apart from all of said plurality of detent recesses, and
wherein, when said adjustment mechanism is positioned in said first position, rotation of said threaded rod causes said turntable to rotate in relation to said base.

8. The assembly of claim 7, wherein:
rotation of said threaded rod causes said detent member to move in relation to said threaded rod along an axis of said threaded rod, and
movement of said detent member in relation to said threaded rod along said axis of said threaded rod causes said turntable to rotate in relation to said base.

9. The assembly of claim 7, wherein said adjustment mechanism further includes a control knob attached to an end portion of said threaded rod.

10. The assembly of claim 7, wherein:
said detent member defines a first lateral surface, a second lateral surface, a front facing surface and a rear facing surface,
said internally threaded passage extends from said first lateral surface to said second lateral surface,
said adjustment mechanism further has a front guide wall and a rear guide wall,
said front facing surface of said detent member is positioned adjacent to said front guide wall, and
said rear facing surface of said detent member is positioned adjacent to said rear guide wall.

11. The assembly of claim 7, wherein said adjustment mechanism pivots between said first position and said second position about a first axis.

12. The assembly of claim 11, wherein:
said threaded rod defines a second axis, and
said first axis is substantially perpendicular to said second axis.

13. An assembly, comprising:
a base defining a plurality of detent recesses;
a turntable rotatable in relation to said base;
a cutting tool operable to cut a work piece positioned on said turntable; and
an adjustment mechanism attached to said turntable and including (i) a support structure, (ii) an actuator supported by said support structure, and (iii) a detent member, and
wherein said adjustment mechanism is movable between (i) a first position in which said detent member is positioned in one of said plurality of detent recesses, and (ii) a second position in which said detent member is spaced apart from all of said plurality of detent recesses, and
wherein, when said adjustment mechanism is positioned in said first position, movement of said actuator causes said turntable to rotate in relation to said base.

14. The assembly of claim 13, wherein:
said support structure defines a first opening and a second opening,
said actuator includes a rod that extends through both said first opening and said second opening, and
rotation of said rod causes said turntable to rotate in relation to said base.

15. The assembly of claim 13, wherein:
said actuator includes an externally threaded rod,
said detent member includes an internally threaded passage, and
said externally threaded rod extends through said internally threaded passage.

16. The assembly of claim 13, wherein:
said support structure includes a first wall, a second wall, a third wall, and a fourth wall arranged to define a space in which said detent member is positioned,
said first wall defines a first opening,
said second wall defines a second opening,
said actuator extends through both said first opening and said second opening,
said detent member is interposed between said first wall and said second wall,
said detent member is interposed between said third wall and said fourth wall, and
said detent member includes a passage through which said actuator extends.

17. The assembly of claim 13, wherein said adjustment mechanism pivots between said first position and said second position about a first axis.

18. The assembly of claim 17, wherein:
said actuator includes a threaded rod that defines a second axis, and
said first axis is substantially perpendicular to said second axis.

19. The assembly of claim 13, wherein said actuator includes an elongate member and a control knob attached to an end of said elongate member.

20. The assembly of claim 13, wherein:
rotation of said actuator about an axis causes said detent member to move in relation to said actuator, and movement of said detent member in relation to said actuator causes rotation of said turntable in relation to said base.

* * * * *